(12) United States Patent
Wen

(10) Patent No.: US 10,778,018 B2
(45) Date of Patent: Sep. 15, 2020

(54) CHARGING PROTECTION METHOD AND APPARATUS

(71) Applicant: Huawei Technologies Co., Ltd., Shenzhen (CN)

(72) Inventor: Chong Wen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/265,609

(22) Filed: Feb. 1, 2019

(65) Prior Publication Data

US 2019/0165588 A1    May 30, 2019

Related U.S. Application Data

(63) Continuation of application No. 15/532,026, filed on May 31, 2017, now Pat. No. 10,250,048, which is a
(Continued)

(51) Int. Cl.
*H02J 7/00* (2006.01)
*H02H 5/04* (2006.01)
(Continued)

(52) U.S. Cl.
CPC .......... *H02J 7/0031* (2013.01); *G08B 21/18* (2013.01); *H02H 5/04* (2013.01); *H02H 7/18* (2013.01);
(Continued)

(58) Field of Classification Search
CPC .. G08B 21/18; H02H 5/04; H02H 7/18; H02J 7/00; H02J 7/0029; H02J 7/0031; H02J 7/0047; H02J 7/04
(Continued)

(56) References Cited

U.S. PATENT DOCUMENTS 2,585,005 A * 2/1952 Godshalk .................. H02J 7/08
320/150
6,518,726 B1    2/2003 Nowlin, Jr. et al.
(Continued)

FOREIGN PATENT DOCUMENTS

CN    101567556 A    10/2009
CN    201821092 U    5/2011
(Continued)

OTHER PUBLICATIONS

"High-Speed USB 2.0 (480 Mbps) DPST Switch with Overvoltage Protection (OVP) and Dedicated Charger Port Detection," ISL54227, XP055258829, Intersil (Sep. 5, 2013).
(Continued)

*Primary Examiner* — Sun J Lin
(74) *Attorney, Agent, or Firm* — Leydig, Voit & Mayer, Ltd.

(57) ABSTRACT

Embodiments of the present invention provide a charging protection method, including: measuring a charging voltage, a charging current, and a temperature rise of a charging interface of a charged device; detecting whether the charging voltage falls beyond a preset voltage range, detecting whether the charging current is less than a preset current threshold, and detecting whether the temperature rise is greater than a preset temperature rise threshold; and if a detection result of any one or more of the three items is yes, disconnecting a charging circuit of a charger. Correspondingly, the embodiments of the present invention further provide a charging protection apparatus, which can disconnect a charging circuit in a timely manner when a charging exception occurs, thereby avoiding damage to a charging interface.

20 Claims, 3 Drawing Sheets

Related U.S. Application Data continuation of application No. PCT/CN2014/095733, filed on Dec. 31, 2014.

(51) Int. Cl.
*H02J 7/04* (2006.01)
*H02H 7/18* (2006.01)
*G08B 21/18* (2006.01)

(52) U.S. Cl.
CPC .............. *H02J 7/00* (2013.01); *H02J 7/0029* (2013.01); *H02J 7/0047* (2013.01); *H02J 7/04* (2013.01); *H02J 7/00304* (2020.01)

(58) Field of Classification Search
USPC ......................................................... 320/107
See application file for complete search history.

(56) References Cited

U.S. PATENT DOCUMENTS

| | | | |
|---|---|---|---|
| 6,819,083 B1 | 11/2004 | Patino et al. | |
| 7,859,226 B2 * | 12/2010 | Nakazawa | H01M 2/34 320/134 |
| 7,902,794 B2 | 3/2011 | Ahmad et al. | |
| 10,250,048 B2 * | 4/2019 | Wen | H02J 7/0047 |
| 2009/0197156 A1 | 8/2009 | Goto | |
| 2009/0268356 A1 | 10/2009 | Mollema et al. | |
| 2012/0039005 A1 | 2/2012 | Kanakubo et al. | |
| 2012/0275076 A1 | 11/2012 | Shono | |
| 2014/0313792 A1 | 10/2014 | Nate et al. | |
| 2015/0022141 A1 | 1/2015 | Oku | |
| 2015/0043117 A1 | 2/2015 | Xiang | |
| 2015/0102778 A1 | 4/2015 | Yang et al. | |
| 2016/0197500 A1 | 7/2016 | Liang | |
| 2017/0358945 A1 | 12/2017 | Zhang et al. | |

FOREIGN PATENT DOCUMENTS

| | | |
|---|---|---|
| CN | 103401224 A | 11/2013 |
| CN | 203368107 U | 12/2013 |
| CN | 103545803 A | 1/2014 |
| CN | 103545882 A | 1/2014 |
| CN | 203434605 U | 2/2014 |
| CN | 103779907 A | 5/2014 |
| CN | 203722280 U | 7/2014 |
| CN | 203761085 U | 8/2014 |
| CN | 104078943 A | 10/2014 |
| EP | 3101757 A1 | 12/2016 |
| JP | 2007214420 A | 8/2007 |
| JP | 2009284688 A | 12/2009 |
| JP | 2010208200 A | 9/2010 |
| JP | 2011008673 A | 1/2011 |
| JP | 5447723 B1 | 3/2014 |
| RU | 2010147857 A | 5/2012 |
| WO | 2014161409 A1 | 10/2014 |

OTHER PUBLICATIONS

U.S. Appl. No. 15/532,026, filed May 31, 2017.

* cited by examiner

CHARGING PROTECTION METHOD AND APPARATUS

CROSS-REFERENCE TO RELATED APPLICATIONS

This application is a continuation of U.S. patent application Ser. No. 15/532,026, filed on May 31, 2017, which is a national stage of International Application No. PCT/CN2014/095733, filed on Dec. 31, 2014. Both of the aforementioned applications are hereby incorporated by reference in their entireties.

TECHNICAL FIELD

Embodiments of the present invention relate to the charging protection field, and in particular, to a charging protection method and apparatus.

BACKGROUND

As functions of a mobile terminal such as a mobile phone become increasingly powerful, a user frequently uses the mobile terminal, resulting in greater power consumption and more frequent charging of the mobile terminal. Pursuit of a thin and light device makes a manufacturer choose a charging interface of increasingly small dimensions. As a result, distances between pins in the charging interface become smaller. In a case of ingress of water, iron filings, carbon powder, or the like into the device, the pins in the charging interface may be short-circuited, and consequently the device may be burned or deformed or even a fire accident may be caused during a process of charging the device.

To resolve the foregoing problem, an existing solution is as follows: A PTC (Positive Temperature Coefficient) resistor is added near the charging interface. When the charging interface generates heat and causes a high temperature, a temperature of the PTC resistor increases, bringing a rapid increase in resistance of the PTC resistor and preventing a large current from passing through, and ensuring overcurrent protection.

However, problems of the existing solution are as follows: The PTC resistor is a thermosensitive component. If a trigger temperature of the PTC resistor is set too low, an erroneous action may occur, and if the trigger temperature is set too high, the PTC resistor cannot provide good protection. In addition, when a temperature of the charging interface reaches the trigger temperature of the PTC resistor, there is a delay for a disconnecting action of the PTC resistor, which may damage the charging interface.

SUMMARY

An objective of embodiments of the present invention is to provide a charging protection method and apparatus, which can resolve a problem in the prior art that a charging interface cannot be effectively protected in a charging process.

To resolve the foregoing technical problem, a first aspect of the embodiments of the present invention provides a charging protection method, including:

measuring a charging voltage, a charging current, and a temperature rise of a charging interface of a charged device;

detecting whether the charging voltage falls beyond a preset voltage range, detecting whether the charging current is less than a preset current threshold, and detecting whether the temperature rise is greater than a preset temperature rise threshold; and disconnecting a charging circuit of a charger if a detection result of any one or more of the three items is yes.

With reference to the first aspect, in a first possible implementation manner, the charging interface is a micro Universal Serial Bus micro USB interface, and the detecting whether the charging voltage falls beyond a preset voltage range, detecting whether the charging current is less than a preset current threshold, and detecting whether the temperature rise is greater than a preset temperature rise threshold includes:

detecting whether a voltage on a D− pin, a D+ pin, or an ID pin of the micro USB interface falls beyond the voltage range, detecting whether a current on a VBUS pin of the micro USB interface is less than the current threshold, and obtaining a temperature measured by a temperature sensor disposed on the micro USB interface, and detecting, according to the obtained temperature, whether the temperature rise of the charging interface is greater than the temperature rise threshold.

With reference to the first possible implementation manner of the first aspect, in a second possible implementation manner, the disconnecting a charging circuit of a charger includes:

controlling a current transmitted, by the charger, on the VBUS pin of the micro USB interface to be grounded by using a MOS transistor.

With reference to the first possible implementation manner of the first aspect, in a third possible implementation manner, the disconnecting a charging circuit of a charger includes:

sending circuit disconnection instruction information to the charger by using the D+ pin and the D− pin, where the circuit disconnection instruction information is used to instruct the charger to disconnect the charging circuit.

With reference to any one of the first aspect to the third possible implementation manner, in a fourth possible implementation manner, the disconnecting a charging circuit of a charger if a detection result of any one or more of the three items is yes further includes:

outputting alarm prompt information, where the alarm prompt information includes audio information and text information.

With reference to the fourth possible implementation manner of the first aspect, in a fifth possible implementation manner, the outputting alarm prompt information includes:

invoking a display apparatus of the charged device to display text information indicating that a charging exception occurs on the charged device, and invoking an audio apparatus of the charged device to output audio information indicating that a charging exception occurs on the charged device.

A second aspect of the embodiments of the present invention provides a charging protection apparatus, including a voltage detection unit, a current detection unit, a temperature detection unit, a power management unit, a temperature sensor, and a micro USB interface, where the voltage detection unit is connected to a D+ pin, a D− pin, and an ID pin of the micro USB interface, and is configured to detect whether a voltage on the D+ pin, the D− pin, or the ID pin falls beyond a preset voltage range;

the current detection unit is connected to a VBUS pin of the micro USB interface, and is configured to detect whether a current on the VBUS pin is less than a preset current threshold;

the temperature detection unit is connected to the temperature sensor, and is configured to obtain a temperature measured by the temperature sensor, and detect, according to the obtained temperature, whether a temperature rise of the micro USB interface is greater than a preset temperature rise threshold; and the charging management unit is separately connected to the voltage detection unit, the current detection unit, and the temperature detection unit, and is configured to disconnect a charging circuit of a charger when a detection result of one or more of the voltage detection unit, the current detection unit, or the temperature detection unit is yes.

With reference to the second aspect, in a first possible implementation manner, the charging management unit is further configured to:

send instruction information to the charger by using the D+ pin and the D− pin, where the instruction information is used to instruct the charger to disconnect the charging circuit.

With reference to the second aspect, in a second possible implementation manner, the charging protection apparatus further includes: a MOS transistor and a diode, where a gate of the MOS transistor is connected to the charging management unit, a drain of the MOS transistor is grounded, a source of the MOS transistor is connected to the VBUS pin of the micro USB interface, a cathode of the diode is connected to the drain of the MOS transistor, and an anode of the diode is connected to the source of the MOS transistor.

With reference to the second aspect to the second possible implementation manner, in a third possible implementation manner, the charging protection apparatus further includes a capacitor, where one terminal of the capacitor is connected to the VBUS pin, and another terminal of the capacitor is grounded.

With reference to any one of the second aspect to the third possible implementation manner, in a fourth possible implementation manner, the charging management unit is further configured to: send alarm prompt information to a charged device, where the alarm prompt information is used to instruct the charged device to use a display device to display text information indicating that a charging exception occurs on the charged device, and instruct the charged device to use an audio apparatus to output audio information indicating that a charging exception occurs on the charged device.

The following beneficial effects are achieved by implementing the present invention:

A charging voltage, a charging current, and a temperature rise of a charging interface are measured. In this way, when one or more of the charging voltage, the charging current, and the temperature rise are abnormal, a charging circuit of a charger can be disconnected in a timely manner before the charging interface is damaged due to a high temperature, thereby effectively avoiding damage to the charging interface.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
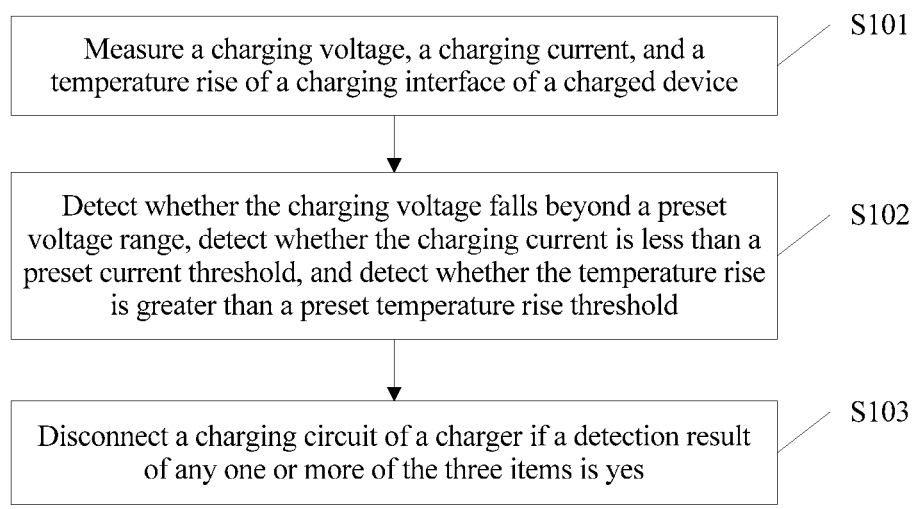
FIG. 1 is a schematic flowchart of a charging protection method according to an embodiment of the present invention.

Referring to FIG. 1, FIG. 1 is a schematic flowchart of a charging protection method according to an embodiment of the present invention. In this embodiment of the present invention, the method includes the following steps.

S101: Measure a charging voltage, a charging current, and a temperature rise of a charging interface of a charged device.

Specifically, a charger is connected to the charged device by using a charging protection apparatus. Mutually mated charging interfaces are separately disposed on the charger and the charged device, and the charging protection apparatus is connected to the charged device by using the charging interface of the charged device. When the charger is connected to the charged device and starts charging the charged device, the charging protection apparatus reads the charging voltage, the charging current, and the temperature rise on the charging interface. The charged device may be a smartphone, a tablet computer, an audio/video entertainment device, or the like, which is not limited in the present invention.

The charging interface includes at least a power-supply pin and a ground pin. The charger charges the charged device by using the power-supply pin and the ground pin. The charging protection apparatus may read the charging voltage of the charging interface by using the power-supply pin in the charging interface. A resistor may be serially connected to the power-supply pin, so as to read a charging current on the resistor. A temperature rise refers to a temperature increase value of the charging interface within a preset time interval.

S102: Detect whether the charging voltage falls beyond a preset voltage range, detect whether the charging current is less than a preset current threshold, and detect whether the temperature rise is greater than a preset temperature rise threshold.

Specifically, the charging protection apparatus detects whether the read charging voltage falls beyond the preset voltage range, detects whether the read charging current is less than the preset current threshold, and detects whether the read temperature rise is greater than the preset temperature rise threshold. The preset temperature rise threshold may be determined according to a temperature rise of another part, except the charging interface, of the charged device.

For example, the preset voltage range is [2.5 V, 5.5 V], the preset current threshold is 1.8 A, the preset temperature rise threshold is 3° C./min, the charging voltage of the charging interface read by the charging protection apparatus is 6 V, the read charging current of the charging interface is 1 A, and the read temperature rise of the charging interface is 5° C./min. Therefore, the charging voltage that is of the charging interface and detected by the charging protection apparatus falls beyond the preset voltage range, the charging current of the charging interface is less than the preset current threshold, and the temperature rise of the charging interface is greater than the preset temperature rise threshold.

S103: Disconnect a charging circuit of a charger if a detection result of any one or more of the three items is yes.

Specifically, that if one or more of the following conditions are met: the charging voltage falls beyond the preset voltage range, the charging current is less than the preset current threshold, and the temperature rise is greater than the preset temperature rise threshold, the charging protection apparatus disconnects the charging circuit of the charger is specifically: When the charging protection apparatus determines that any one of the foregoing conditions is met, the charging protection apparatus disconnects the charging circuit of the charger; or when the charging protection apparatus determines that any two of the foregoing conditions are met, the charging protection apparatus disconnects the charging circuit of the charger; or when the charging protection apparatus determines that the foregoing three conditions are met, the charging protection apparatus disconnects the charging circuit of the charger.

The charging protection apparatus may disconnect the charging circuit on a charged side, or may instruct the charger to locally disconnect the charging circuit.

In this embodiment of the present invention, a charging voltage, a charging current, and a temperature rise of a charging interface are measured. In this way, when one or more of the charging voltage, the charging current, and the temperature rise are abnormal, a charging circuit of a charger can be disconnected in a timely manner, thereby effectively avoiding damage to the charging interface.

Optionally, in some embodiments of the present invention, the charging interface is a micro Universal Serial Bus micro USB interface, and the detecting whether the charging voltage falls beyond a preset voltage range, detecting whether the charging current is less than a preset current threshold, and detecting whether the temperature rise is greater than a preset temperature rise threshold includes:

detecting whether a voltage on a D– pin, a D+ pin, or an ID pin of the micro USB interface falls beyond the voltage range, detecting whether a current on a VBUS pin of the micro USB interface is less than the current threshold, and obtaining a temperature measured by a temperature sensor disposed on the micro USB interface, and detecting, according to the obtained temperature, whether the temperature rise of the charging interface is greater than the temperature rise threshold.

Specifically, the charging interface of the charged device is a micro USB interface. The micro USB interface may be used as the charging interface or a data interface, and includes five pins, which are respectively the VBUS pin (which is a power-supply pin), the D+ pin: a positive data pin, the D– pin: a negative data pin, and the ID (Identity) pin: a reserved pin, and the ground pin: a signal ground pin. The micro USB interface of the charged device and a micro USB interface of the charger are mutually mated. One interface is a male connector, and the other interface is a female connector. When the micro USB interface of the charger is inserted into the micro USB interface of the charged device, the charger starts charging the charged device.

When the charging protection apparatus detects that the charger is connected to the charged device by using the micro USB interface and that the charger outputs power, the charging protection apparatus measures the voltage on the D– pin, the D+ pin, or the ID pin of the micro USB interface of the charged device, and detects whether the voltage falls beyond the preset voltage range; the charging protection apparatus measures the current on the VBUS pin of the micro USB interface of the charged device, and detects whether the current is less than the preset current threshold; and the charging protection apparatus obtains a temperature measured by the temperature sensor, and detects, according to the obtained temperature, whether the temperature rise of the micro USB interface is greater than the preset temperature rise threshold, where the temperature sensor is disposed beside the micro USB interface, and in order to obtain good heat conduction, the temperature sensor is closely next to a metal part of the micro USB interface.

Optionally, in some embodiments of the present invention, the disconnecting a charging circuit of a charger includes: controlling a current transmitted, by the charger, on the VBUS pin of the micro USB interface to be grounded by using a MOS transistor.

Specifically, a MOS (Metal Oxide Semiconductor) transistor is disposed on the charging protection apparatus, and the VBUS pin is grounded by using the MOS transistor. When the charging protection apparatus needs to disable the charging circuit of the charger, the charging protection apparatus loads a turn-on voltage to a gate of the MOS transistor, so that the current transmitted, by the charger, on the VBUS pin is grounded by using the MOS transistor. Alternatively, the charging protection apparatus may implement, by using a relay, forcible grounding of the current transmitted on the VBUS pin.

Optionally, in some embodiments of the present invention, the disconnecting a charging circuit of a charger includes:

sending circuit disconnection instruction information to the charger by using the D+ pin and the D– pin, where the circuit disconnection instruction information is used to instruct the charger to disconnect the charging circuit.

Specifically, the charger supports a high-voltage quick charge protocol. When an error occurs on the charging interface, the charging protection apparatus sends the circuit disconnection instruction information to the charger, to instruct the charger to disable power output. The charging protection apparatus interacts with the charger by using the D+ pin and the D– pin of the micro USB interface. After successfully disabling the power output, the charger returns a response message to the charging protection apparatus.

It should be noted that, after the charging protection apparatus sends the circuit disconnection instruction information to the charger, if the charger fails to disconnect the charging circuit, the charging protection apparatus controls the current transmitted, by the charger, on the VBUS pin of the micro USB interface to be grounded by using the MOS transistor. A method by which the charging protection apparatus determines whether the charger successfully disconnects the charging circuit may be: If the charging protection apparatus does not receive, within preset duration, a response message that is returned by the charger and indicates that circuit disconnection is successful, it is indicated that the charger fails to disconnect the charging circuit; or the charger detects whether the charging voltage of the charging interface of the charged device falls beyond the preset voltage range, detects whether the charging current is less than the preset current threshold, and detects whether the temperature rise is greater than the preset temperature rise threshold, and if a detection result of any one or more of the three items is yes, it is indicated that the charger fails to disconnect the charging circuit.

The D− pin and the D+ pin may be open-circuited because of a high temperature of or ingress of water into the micro USB interface, so that the charging protection apparatus and the charger cannot exchange information between each other. A policy used by the charging protection apparatus is as follows: The charging protection apparatus sends the charger a circuit disconnection instruction message for a preset quantity of times by using the D+ pin and the D− pin, and if the charging protection apparatus does not receive, within preset duration, a response message returned by the charger, the charging protection apparatus forcibly grounds the VBUS pin on a charged device side.

When detecting that the charging voltage or the charging current is abnormal but the temperature rise is normal, the charging protection apparatus may output alarm prompt information but not disable the charging circuit of the charger, where the alarm prompt information includes audio information or text information, for example, the text information is: Charging exception, please unplug the charger.

Optionally, in some embodiments of the present invention, the disconnecting a charging circuit of a charger if a detection result of any one or more of the three items is yes further includes:

outputting alarm prompt information, where the alarm prompt information includes audio information and text information.

Specifically, the charging protection apparatus may instruct the charged device to output the alarm prompt information, or may locally output the alarm prompt information.

Optionally, in some embodiments of the present invention, the outputting alarm prompt information includes:

invoking a display apparatus of the charged device to display text information indicating that a charging exception occurs on the charged device, and invoking an audio apparatus of the charged device to output audio information indicating that a charging exception occurs on the charged device.

Specifically, the charging protection apparatus sends a charging exception notification to the charged device. After receiving the notification, the charged device displays, on a display screen, text information indicating that a charging exception occurs, and also adjusts a volume to the highest and outputs a voice prompt by using a speaker.

In this embodiment of the present invention, a charging voltage, a charging current, and a temperature rise of a charging interface are measured. In this way, when one or more of the charging voltage, the charging current, and the temperature rise are abnormal, a charging circuit of a charger can be disconnected in a timely manner, thereby effectively avoiding damage to the charging interface.

Figure 2:
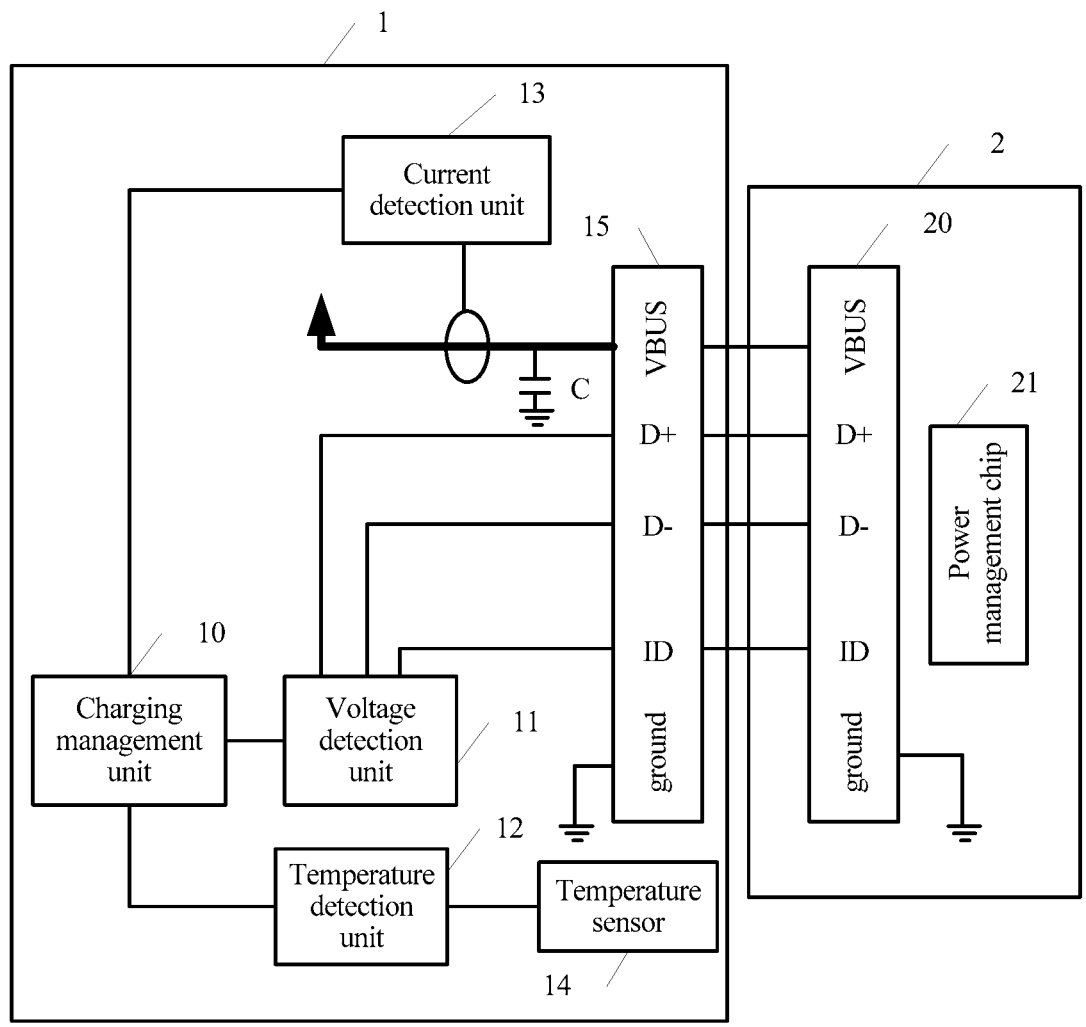
FIG. 2 is a schematic structural diagram of a charging protection apparatus according to an embodiment of the present invention.

Referring to FIG. 2, FIG. 2 is a schematic structural diagram of a charging protection apparatus according to an embodiment of the present invention. In this embodiment of the present invention, a charging protection apparatus 1 includes: a charging management unit 10, a voltage detection unit 11, a temperature detection unit 12, a current detection unit 13, a temperature sensor 14, and a micro USB interface 15. A charged device is connected to a built-in micro USB interface 20 of a charger 2 by using the built-in micro USB interface 15. The voltage detection unit 11 is connected to a D+ pin, a D− pin, and an ID pin of the micro USB interface 15, and is configured to detect whether a voltage on the D+ pin, the D− pin, or the ID pin falls beyond a preset voltage range. The current detection unit 13 is connected to a VBUS pin of the micro USB interface 15, and is configured to detect whether a current on the VBUS pin is less than a preset current threshold. The temperature detection unit 12 is connected to the temperature sensor 14, and is configured to obtain a temperature measured by the temperature sensor 14, and detect, according to the obtained temperature, whether a temperature rise of the micro USB interface 15 is greater than a preset temperature rise threshold, where the temperature sensor is disposed near the micro USB interface 15. The charging management unit 10 is separately connected to the voltage detection unit 11, the current detection unit 13, and the temperature detection unit 12, and is configured to disconnect a charging circuit of the charger 2 when a detection result of one or more of the voltage detection unit 11, the current detection unit 13, or the temperature detection unit 12 is yes.

Figure 3:
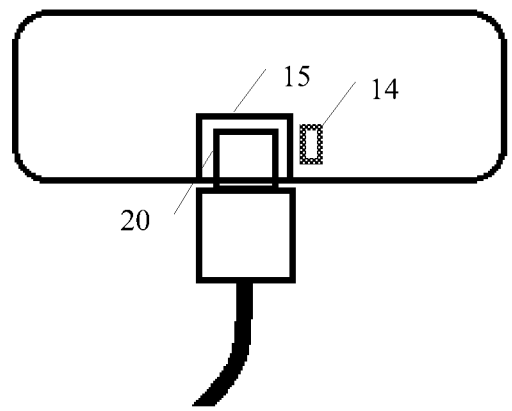
FIG. 3 is a schematic structural diagram of a charging interface according to an embodiment of the present invention.

The charger 2 includes the micro USB interface 20 and a power management chip 21. The micro USB interface 20 of the charger 2 and the micro USB interface 15 of the charged device are mutually mated. As shown in FIG. 3, the micro USB interface 15 is a female connector, and the micro USB interface 20 is a male connector. The temperature sensor 14 is disposed near the micro USB interface 15. A method by which the charging protection apparatus 1 disconnects the charging circuit of the charger 2 may be: disconnecting the charging circuit of the charger 2 on a charged device side, or instructing the charger to disconnect the local charging circuit. After disconnecting the charging circuit, the charging protection apparatus 1 sends the charged device a notification indicating that a charging exception occurs. After receiving the notification, the charged device displays, on a display screen, text information indicating that a charging exception occurs, and also adjusts a volume to the highest and outputs a voice prompt by using a speaker.

Optionally, in some embodiments of the present invention, the charging management unit 10 is further configured to: send instruction information to the charger 2 by using the D+ pin and the D− pin, where the instruction information is used to instruct the charger 2 to disconnect the charging circuit.

Figure 4:
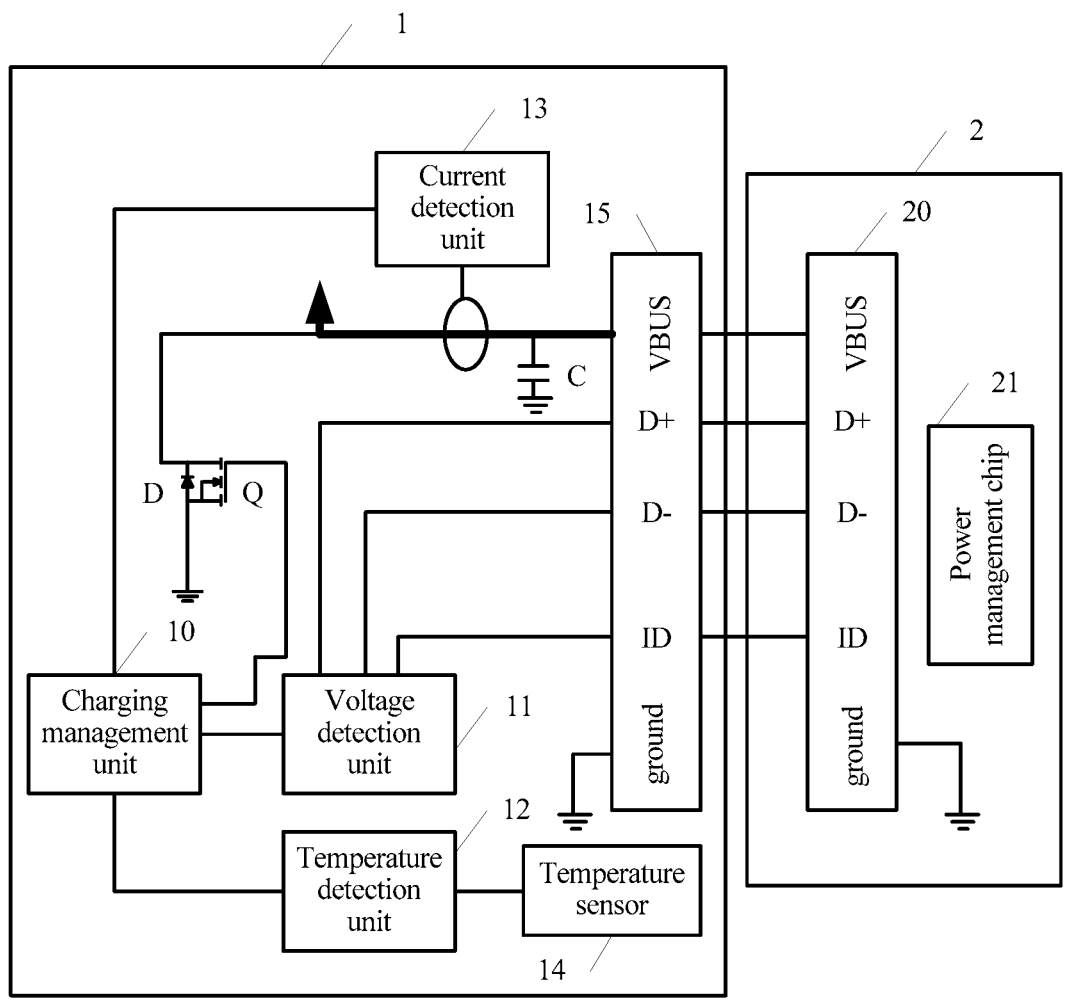
FIG. 4 is another schematic structural diagram of a charging protection apparatus according to an embodiment of the present invention.

Optionally, as shown in FIG. 4, in some embodiments of the present invention, the charging protection apparatus 1 further includes a MOS transistor Q and a diode D, where a gate of the MOS transistor Q is connected to the charging management unit 10, a drain of the MOS transistor Q is grounded, a source of the MOS transistor Q is connected to the VBUS pin of the micro USB interface 15, a cathode of the diode D is connected to the drain of the MOS transistor Q, and an anode of the diode D is connected to the source of the MOS transistor.

Specifically, when determining that one or more of the charging voltage, the charging current, or the temperature rise are abnormal, the charging management unit 10 loads a turn-on voltage by using the gate of the MOS transistor Q, to ground power output that is transmitted on the VBUS pin by the charger 2. In this way, charging power of the charger 2 is not loaded to the charged device.

Optionally, in some embodiments of the present invention, the charging protection apparatus 1 further include a capacitor C, where one terminal of the capacitor is connected to the VBUS pin, and another terminal of the capacitor is grounded.

Optionally, in some embodiments of the present invention, the charging management unit 10 is further configured to: send alarm prompt information to the charged device, where the alarm prompt information is used to instruct the charged device to use a display device to display text information indicating that a charging exception occurs on the charged device, and instruct the charged device to use an audio apparatus to output audio information indicating that a charging exception occurs on the charged device.

The charging protection apparatus 1 may be located in the charged device and is a part of the charged device; or the charging protection apparatus and the charged device may be independent from each other, which is not limited in the present invention.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A charging system, comprising:
a device; and
a charger configured to supply charging power to charge the device;
wherein the device is configured to:
measure a charging voltage, a charging current, and a temperature rise of a charging interface of the device when the charger and the device are connected;
detect whether the charging voltage is in a preset voltage range;
detect whether the charging current is less than a preset current threshold;
detect whether the temperature rise is greater than a preset temperature rise threshold; and
disconnect a charging circuit of the charger when at least one of the following conditions is met:
the charging voltage is not in the preset voltage range;
the charging current is less than the preset current threshold; or
the temperature rise is greater than the preset temperature rise threshold.

2. The charging system according to claim 1, wherein the charging voltage is a voltage on a data pin of the charging interface of the device, or the charging voltage is a voltage on an identity (ID) pin of the charging interface of the device.

3. The charging system according to claim 1, wherein the device is further configured to:
control a current transmitted, by the charger, on the charging interface to be grounded using a metal oxide semiconductor (MOS) transistor.

4. The charging system according to claim 1, wherein the device is further configured to:
send circuit disconnection instruction information to the charger, wherein the circuit disconnection instruction information instructs the charger to disconnect the charging circuit.

5. The charging system according to claim 1, wherein the device is further configured to:
control a current transmitted, by the charger, on the charging interface to be grounded using a metal oxide semiconductor (MOS) transistor when the charger fails to disconnect the charging circuit.

6. The charging system according to claim 1, wherein the device comprises a display screen, wherein the device is further configured to:
display text information indicating that a charging exception occurs via the display screen.

7. The charging system according to claim 1, wherein the device comprises an audio apparatus, wherein the device is further configured to:
output audio information indicating that a charging exception occurs via the audio apparatus.

8. A charging protection apparatus, comprising a voltage detector, a current detector, a temperature detector, and a charging manager, wherein
the voltage detector is connected to a charging interface of a device, and the voltage detector is configured to detect whether a charging voltage of the charging interface belongs to a preset voltage range when a charger and the device are connected;
the current detector is connected to the charging interface of the device, and the current detector is configured to detect whether a charging current is less than a preset current threshold when the charger and the device are connected;
the temperature detector is connected to a temperature sensor located near the charging interface, and the temperature detector is configured to obtain a temperature measured by the temperature sensor, and detect whether a temperature rise is greater than a preset temperature rise threshold; and
the charging manager is connected to the voltage detector, the current
detector, and the temperature detector, and is configured to disconnect a charging circuit of the charger when at least one of the following conditions is met:
the charging voltage is not in the preset voltage range;
the charging current is less than the preset current threshold; or
the temperature rise is greater than the preset temperature rise threshold.

9. The charging protection apparatus according to claim 8, wherein the charging voltage is a voltage on a data pin of the charging interface of the device, or the charging voltage is a voltage on an identity (ID) pin of the charging interface of the device.

10. The charging protection apparatus according to claim 8, wherein the device is further configured to:
control a current transmitted, by the charger, on the charging interface to be grounded using a metal oxide semiconductor (MOS) transistor.

11. The charging protection apparatus according to claim 8, wherein the charging manager is further configured to:

send instruction information to the charger, wherein the instruction information instructs the charger to disconnect the charging circuit.

12. The charging protection apparatus according to claim 11, wherein the device is further configured to:
control a current transmitted, by the charger, on the charging interface to be grounded by using a metal oxide semiconductor (MOS) transistor when the charger fails to disconnect the charging circuit.

13. The charging protection apparatus according to claim 8, wherein the charging manager is further configured to: send alarm prompt information to a charged device.

14. An electronic device, comprising a charging protection apparatus and a charging interface, wherein the charging protection apparatus is configured to:
measure a charging voltage, and a temperature rise of the charging interface of the electronic device when a charger and the electronic device are connected;
detect whether the charging voltage is in a preset voltage range;
detect whether the temperature rise is greater than a preset temperature rise threshold; and
disconnect a charging circuit of the charger when at least one of the following conditions is met:
the charging voltage is not within to a preset voltage range; or
the temperature rise is greater than a preset temperature rise threshold.

15. The electronic device according to claim 14, wherein the charging voltage is a voltage on a data pin of a charging interface of the electronic device, or the charging voltage is a voltage on an identity (ID) pin of the charging interface of the electronic device.

16. The electronic device according to claim 14, wherein the charging protection apparatus is further configured to:
control a current transmitted, by the charger, on the charging interface to be grounded by using a metal oxide semiconductor (MOS) transistor.

17. The electronic device according to claim 14, wherein the charging protection apparatus is further configured to:
send circuit disconnection instruction information to the charger, wherein the circuit disconnection instruction information instructs the charger to disconnect the charging circuit.

18. The electronic device according to claim 17, wherein the charging protection apparatus is further configured to:
control a current transmitted, by the charger, on the charging interface to be grounded by using a metal oxide semiconductor (MOS) transistor when the charger fails to disconnect the charging circuit.

19. The electronic device according to claim 14, wherein the electrical device comprises at least one of a display screen or an audio apparatus; wherein
the display screen is configured to display text information indicating that a charging exception occurs on the electrical device, and
the audio apparatus is configured to output audio information indicating that a charging exception occurs on the electrical device.

20. The electronic device according to claim 14, wherein the charging protection apparatus is configured to:
measure a charging current of the charging interface of the electrical device when the charger and the electronic device are connected;
detect whether the charging current is less than a preset current threshold; and
disconnect the charging circuit of the charger when at least one of the following conditions is met:
the charging voltage is not in a preset voltage range;
the charging current is less than the preset current threshold; or
the temperature rise is greater than a preset temperature rise threshold.

* * * * *